United States Patent [19]
Shinjo et al.

[11] Patent Number: 5,652,905
[45] Date of Patent: Jul. 29, 1997

[54] DATA PROCESSING UNIT

[75] Inventors: Naoki Shinjo; Shigeru Nagasawa; Masayuki Ikeda; Haruhiko Ueno; Teruo Utsumi; Kazushige Kobayakawa; Masami Dewa; Kenichi Ishizaka; Tadao Amada, all of Kawasaki, Japan

[73] Assignee: Fujitsu Limited, Kawasaki, Japan

[21] Appl. No.: 463,926

[22] Filed: Jun. 5, 1995

Related U.S. Application Data

[62] Division of Ser. No. 166,929, Dec. 15, 1993.

[30] Foreign Application Priority Data

Dec. 18, 1992 [JP] Japan ................... 4-339096
Dec. 18, 1992 [JP] Japan ................... 4-339097

[51] Int. Cl.$^6$ ........................... G06F 13/00
[52] U.S. Cl. ........................ 395/800; 395/200.03
[58] Field of Search ............... 395/800; 370/94.1, 370/85.1, 85.6, 340, 825.5, 85.2, 67; 371/16.3, 62

[56] References Cited

U.S. PATENT DOCUMENTS

| 3,648,256 | 3/1972 | Paine et al. | 340/172.5 |
|---|---|---|---|
| 4,365,294 | 12/1982 | Stokken | 395/550 |
| 4,506,324 | 3/1985 | Healy | 364/200 |
| 4,700,292 | 10/1987 | Campanini | 371/9 |
| 5,010,477 | 4/1991 | Omoda et al. | 395/800 |
| 5,038,347 | 8/1991 | Courtors | 370/94.1 |
| 5,050,066 | 9/1991 | Myers et al. | 395/182.16 |
| 5,253,346 | 10/1993 | Okabayashi et al. | 395/325 |
| 5,379,307 | 1/1995 | Ishibashi et al. | 371/62 |
| 5,410,650 | 4/1995 | Sasaki et al. | 395/200 |

FOREIGN PATENT DOCUMENTS

| 0157075 | 10/1985 | European Pat. Off. . |
|---|---|---|
| 0409285 | 1/1991 | European Pat. Off. . |
| 0502214 | 9/1992 | European Pat. Off. . |
| 4-167842 | 6/1992 | Japan . |
| WO9000841 | 1/1990 | WIPO . |

*Primary Examiner*—Mehmet B. Geckil
*Attorney, Agent, or Firm*—Staas & Halsey

[57] ABSTRACT

A data processing unit is adapted to exchange data with another data processing unit via a network. The data processing unit includes a main storage for storing programs and data, an instruction processor for issuing transfer requests by executing programs stored in the main storage, and a transfer processor for enqueuing the transfer requests from the instruction processor into a transfer request queue, and for carrying out a transfer process between the main storage and the network based on each transfer request which is obtained from the transfer request queue. The transfer processor includes a failure display for displaying a failure when the failure occurs during the transfer process of each transfer request, a reference to and an erasure of a content of the failure display are possible from the instruction processor. The transfer process of the transfer request enqueued in the transfer request queue is prohibited during a time in which the failure is displayed in the failure display.

6 Claims, 14 Drawing Sheets

DATA PROCESSING UNIT

This application is a division of application Ser. No. 08/166,929, filed Dec. 15, 1993, now pending.

BACKGROUND OF THE INVENTION

The present invention generally relates to data processing units, and more particularly to a data processing unit which transfers data between another data processing unit via a network.

In a data processing system such as a parallel computer system having a plurality of data processing units which are coupled via a network or the like, a parallel data processing is carried out by transferring data among the plurality of data processing units.

Conventionally, when transferring the content of a storage region of an arbitrary data processing unit to another data processing unit, a transfer request queue is provided to queue data transfer requests made with respect to the other data processing unit, and a user program which is executed by an instruction processor successively enqueues the transfer requests to the transfer request queue. A transfer processor, which operates independently of the instruction processor, carries out a transfer process by reading the transfer request from the transfer request queue as long as the transfer request is enqueued in the transfer request queue. Such a system is proposed in a Japanese Laid-Open Patent Application No.4-167842, for example. According to the above described system, it is possible to greatly improve the throughput because the instruction processor and the transfer processor operate independently and the load and overhead of the instruction processor are reduced.

But according to the conventional system described above, when a series of data are divided into a plurality of packets and transferred and the end of the transfer is monitored at the receiving end by polling the arrival of the packet of the last data, an intermediate packet may be missing from the series of data transmitted from the transmitting end. In other words, when transferring the series of data in packets, the transmission of an intermediate one of the packets may be suppressed due to a failure at the transmitting end such as a program exception and a machine check (or hardware damage). In this case, although the transmission of the intermediate packet is suppressed, the transfer process advances to the next packet, and there is no way of knowing at the receiving end that the intermediate packet was not transferred. Therefore, there was a problem in that the receiving end erroneously recognizes the normal end of the data transmission when the packet of the last data arrives, even though not all of the data was transferred and the intermediate packet is missing.

SUMMARY OF THE INVENTION

Accordingly, it is a general object of the present invention to provide a novel and useful data processing unit in which the problems described above are eliminated.

Another and more specific object of the present invention is to provide a data processing unit adapted to exchange data with another data processing unit via a network, comprising main storage means for storing programs and data, instruction processor means, coupled to the main storage means, for issuing transfer requests by executing programs stored in the main storage means, and transfer processor means, coupled to the main storage means and the instruction processor means, for enqueuing the transfer requests from the instruction processor means into a transfer request queue, and for carrying out a transfer process between the main storage means and the network based on each transfer request which is obtained from the transfer request queue, where the transfer processor means includes failure display means for displaying a failure when the failure occurs during the transfer process of each transfer request, a reference to and an erasure of a content of the failure display means are possible from the instruction processor means, and the transfer process of the transfer request enqueued in the transfer request queue is prohibited during a time in which the failure is displayed in the failure display means. According to the data processing unit of the present invention, it is possible to correctly recognize the end of the transfer request at the receiving data processing unit even if the transfer of an intermediate packet is suppressed during transfer of a plurality of packets in response to a single transfer request. This is because the packet following the intermediate packet is prohibited until the failure recovery process is carried out.

Still another object of the present invention is to provide a data processing unit adapted to exchange data with another data processing unit via a network, comprising main storage means for storing programs and data, instruction processor means, coupled to the main storage means, for issuing transfer requests by executing programs stored in the main storage means, transfer processor means, coupled to the main storage means and the instruction processor means, for enqueuing the transfer requests from the instruction processor means into a transfer request queue, and for carrying out a transfer process between the main storage means and the network based on each transfer request which is obtained from the transfer request queue, and counter means for storing a content which is updated by the transfer processor means every time the transfer process is carried out based on the transfer request and is accessible by the instruction processor means, so that the instruction processor means can recognize an end of the transfer process by the transfer processor means from the content of the counter means. According to the data processing unit of the present invention, no additional control information is required to discriminate the end of the transfer, and the discriminating algorithm used is simple. Hence, it is possible to effectively reduce the overhead of the instruction processor means.

Other objects and further features of the present invention will be apparent from the following detailed description when read in conjunction with the accompanying drawings.

DESCRIPTION OF THE PREFERRED EMBODIMENTS

Figure 1:
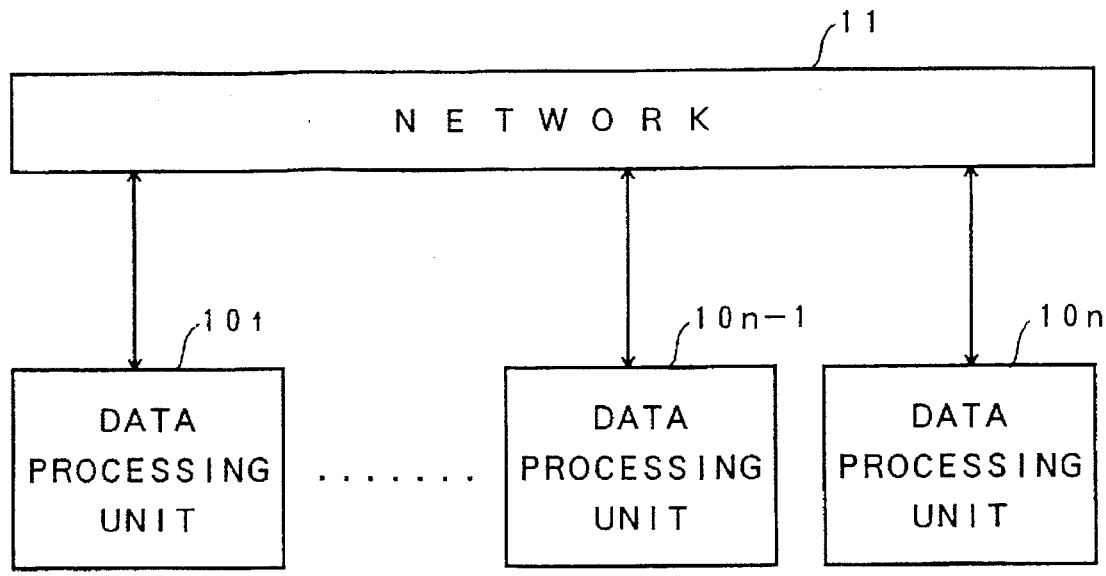
FIG. 1 is a system block diagram showing a parallel computer system to which the present invention may be applied.

FIG. 1 shows a parallel computer system to which the present invention may be applied. The parallel computer system shown in FIG. 1 includes a plurality of data processing units $10_1$ through $10_n$ which are coupled via a network 11. Each of the data processing units $10_1$ through $10_n$ can transfer data among each other via the network 11, and independently carry out a data processing.

Figure 2:
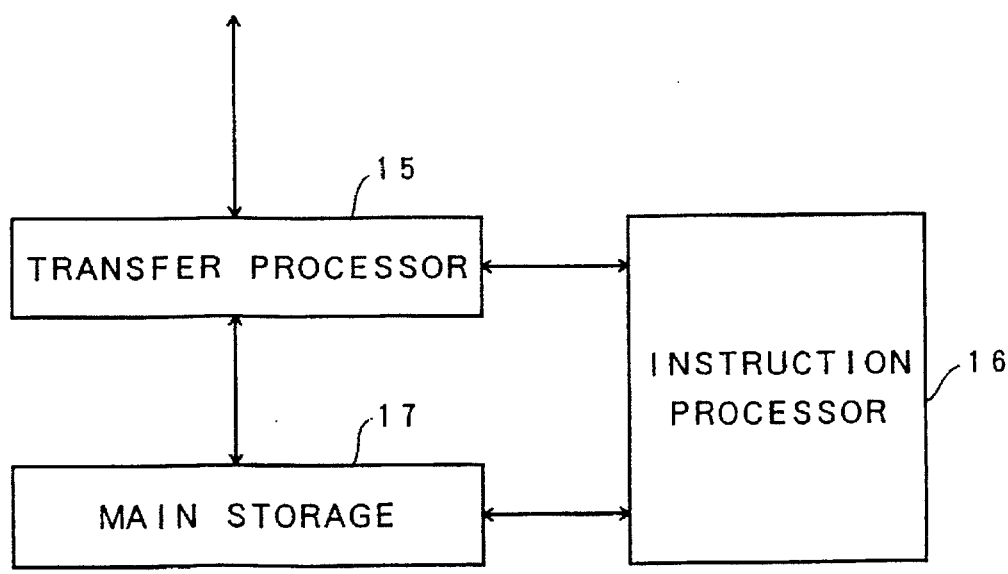
FIG. 2 is a system block diagram showing the general construction of a data processing unit according to the present invention.

Each data processing unit $10_i$ has a general construction shown in FIG. 2, where i=1, ..., n. The data processing unit $10_i$ includes a transfer processor 15, an instruction processor 16, and a main storage 17. The transfer processor 15 carries out a packet transfer process between the main storage 17 and the network 11 shown in FIG. 1 in response to an instruction from the instruction processor 16. The transfer packet includes a header, and body data which form the transfer data body. The header includes information related to a memory access attribute at the data processing units on the transmitting (or source) side and the receiving (or destination) side, information specifying the process at the data processing unit at the receiving side and the like.

The instruction processor 16 reads and executes programs stored in the main storage 17, to process data stored in the main storage 17.

Figure 3:
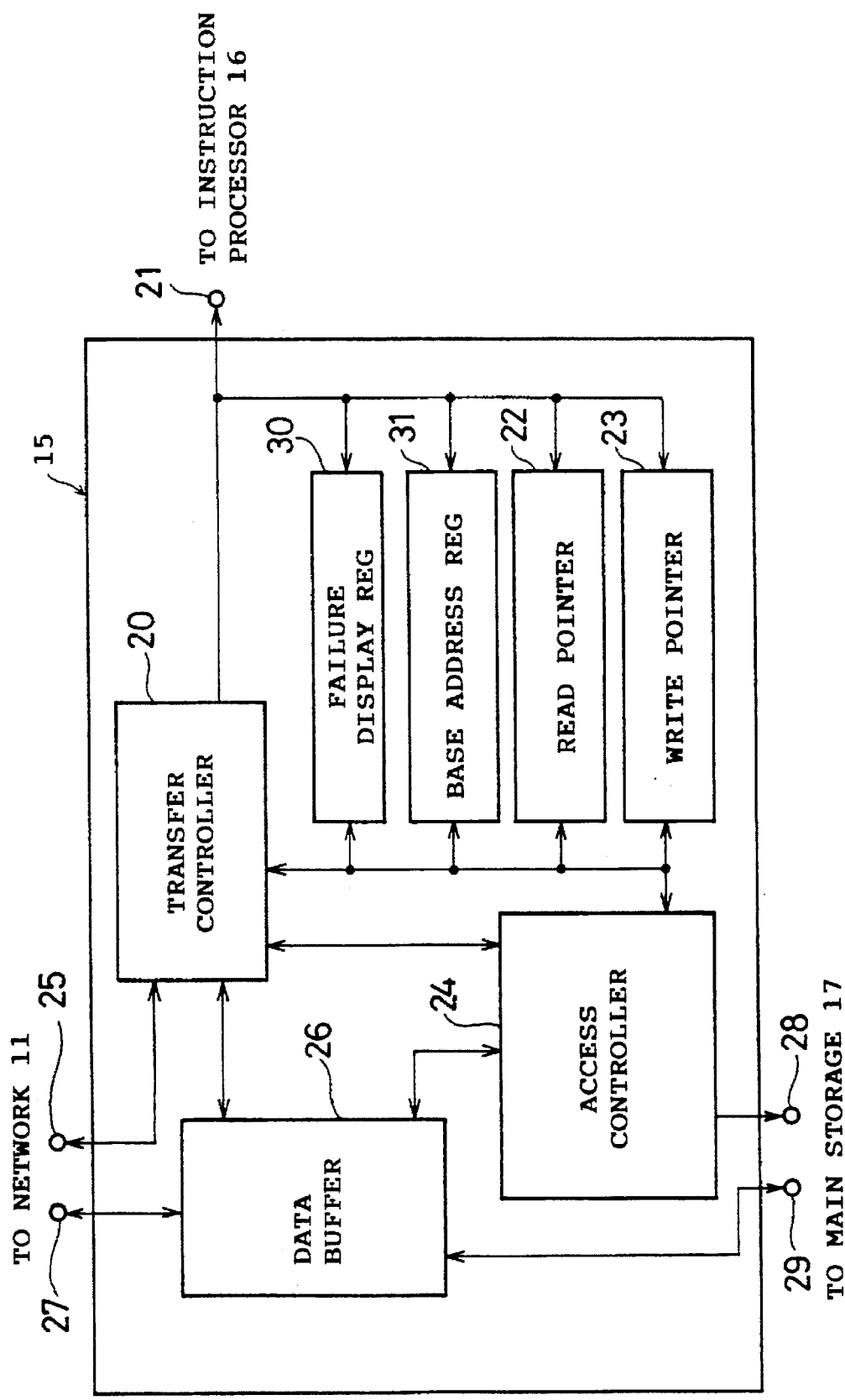
FIG. 3 is a system block diagram showing a transfer processor of a first embodiment of the data processing unit according to the present invention.

FIG. 3 shows an essential part of a first embodiment of the data processing unit according to the present invention. More particularly, FIG. 3 shows the transfer processor 15 of the first embodiment.

In FIG. 3, the transfer processor 15 includes a network transfer controller (hereinafter simply referred to as a transfer controller) 20, a transfer queue read pointer 22, a transfer queue write pointer 23, a main storage access controller (hereinafter simply referred to as an access controller) 24, a data buffer 26, a failure display register 30, and a transfer queue base address register 31 which are coupled as shown. The transfer processor 15 further includes a port 21 which couples to the instruction processor 16, ports 25 and 27 which couple to the network 11, and ports 28 and 29 which couple to the main storage 17.

The transfer controller 20 is started in response to an instruction from the instruction processor 16 which is received via the port 21, and starts a transfer process based on the values of the transfer queue read pointer 22 and the transfer queue write pointer 23. Hence, the transfer controller 20 issues a main storage access request with respect to the access controller 24 so as to read the header and body data of the transfer packet, and transmits the transfer packet from the data buffer 26 to the network 11 via the port 27 by controlling an interface (not shown) which couples the transfer processor 15 to the network 11 via the port 25. In addition, the transfer controller 20 sets an interrupt display flag in the failure display register 30 and writes the state of the failure if the transmission of the packet is suppressed by a failure that is generated, such as a program exception and a hardware damage. The transfer controller 20 also increments the transfer queue read pointer 22 when the transfer ends.

The access controller 24 makes an access to the main storage 17 via the port 28 in response to an instruction from the transfer controller 20, and controls the data transfer between the main storage 17 and the data buffer 26 via the port 29. When making the data transfer between the main storage 17 and the network 11, the data buffer 26 temporarily buffers the data. In addition, the data buffer 26 temporarily buffers the data when the transfer controller 20 and the access controller 24 read and write the necessary data with respect to the main storage 17.

The transfer queue base address register 31 stores a start address of a transfer request queue (hereinafter simply referred to as a transfer queue) in the main storage 17. The instruction processor 16 can make a reference to and update the content of the transfer queue base address register 31. The transfer queue write pointer 23 manages information indicating to which transfer request of the transfer queue the instruction processor 16 has enqueued. The transfer queue read pointer 22 manages information indicating to which the transfer request of the transfer queue the transfer process has ended.

When the packet transmission is suppressed by a failure, the failure display register 30 requests an interrupt by the instruction processor 16 by the interrupt display flag. The failure display register 30 also displays the state of the failure, so that the failure can be managed.

Figure 4:
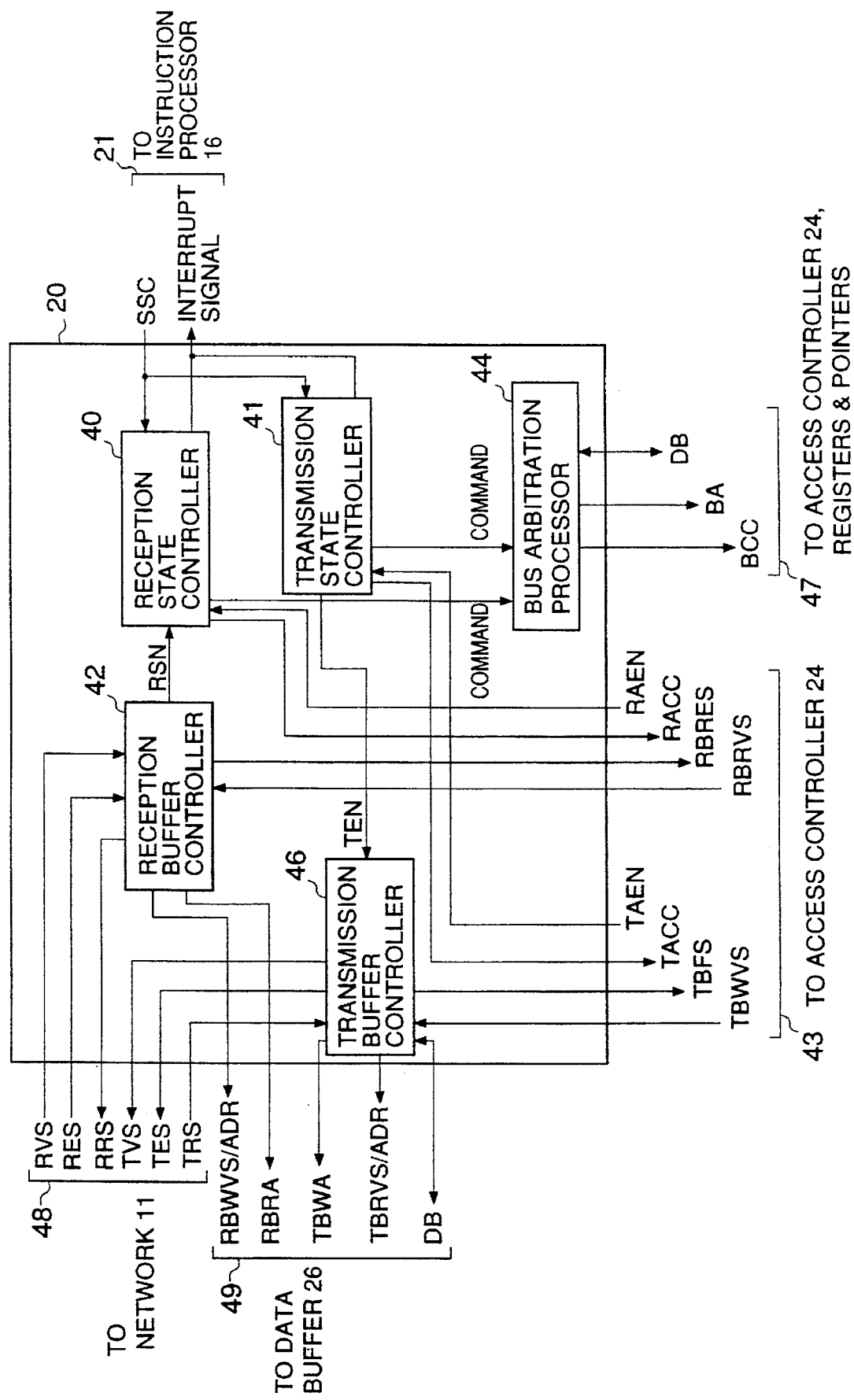
FIG. 4 is a system block diagram showing a network transfer controller of the first embodiment.

FIG. 4 shows an embodiment of the transfer controller 20. The transfer controller 20 shown in FIG. 4 includes a reception state controller 40, a transmission state controller 41, a reception buffer controller 42, a bus arbitration processor 44, and a transmission buffer controller 46 which are coupled as shown. A start/stop command SSC which is received via the port 21 is supplied to the reception state controller 40 and the transmission state controller 41.

In addition to the start/stop command SSC, the reception state controller 40 also receives a reception start notification RSN from the reception buffer controller 42 and a reception access end notification RAEN from the access controller 24 via a port 43, and manages the reception state. The reception state controller 40 supplies to the bus arbitration processor 44 read/write commands R/W of the registers and pointers which are coupled via a port 47, and also supplies a reception access control command RACC to the access controller 24.

In addition to the start/stop command SSC, the transmission state controller 41 also receives a transmission access end notification TAEN from the access controller 24 via the port 43, and manages the transmission state. The transmission state controller 41 supplies to the bus arbitration processor 44 the read/write commands R/W of the registers and pointers which are coupled via the port 47. The transmission state controller 41 also supplies a transmission access control command TACC to the access controller 24 and a transmission end notification TEN to the transmission buffer controller 46.

The bus arbitration processor 44 carries out an arbitration of commands received from the reception state controller 40 and the transmission state controller 41, and supplies a bus control command BCC, a bus address BA and data D to a bus via the port 47. This bus is coupled to the failure display register 30, the transfer queue base address register 31, the transfer queue read pointer 22, the transfer queue write pointer 23, and the access controller 24.

The reception buffer controller 42 receives a reception valid signal RVS and a reception end signal RES from the network 11 via a port 48, and supplies a reception buffer write valid signal RBWVS and an address ADR from the network 11 to the data buffer 26 via a port 49. The reception buffer controller 42 also supplies a reception response signal RRS to the network 11 via the port 48. Further, and supplies a reception buffer read address RBRA to the data buffer 26 via the port 49. The reception buffer controller 42 receives a reception buffer read valid signal RBRVS from the access controller 24 via the port 43.

The transmission buffer controller 46 receives a transmission buffer write valid signal TBWVS from the access controller 24 via the port 43, and supplies a transmission buffer write address TBWA to the data buffer 26 via the port 49. The transmission buffer controller 46 also supplies a transmission buffer read valid signal TBRVS and an address ADR to the data buffer 26 via the port 49, and supplies a transmission valid signal TVS to the network 11 via the port 48. The transmission buffer controller 46 receives a transmission response signal TRS from the network 11 via the port 48. In addition, the transmission buffer controller 46 supplies a transmission end signal TES to the network 11 via the port 48 when the transmission end notification TEN is received. Further, the transmission buffer controller 46 is coupled to the data buffer 26 via the port 49 and a data bus, and carries out predetermined check and modification of the control information included in the transfer request.

Figure 5:
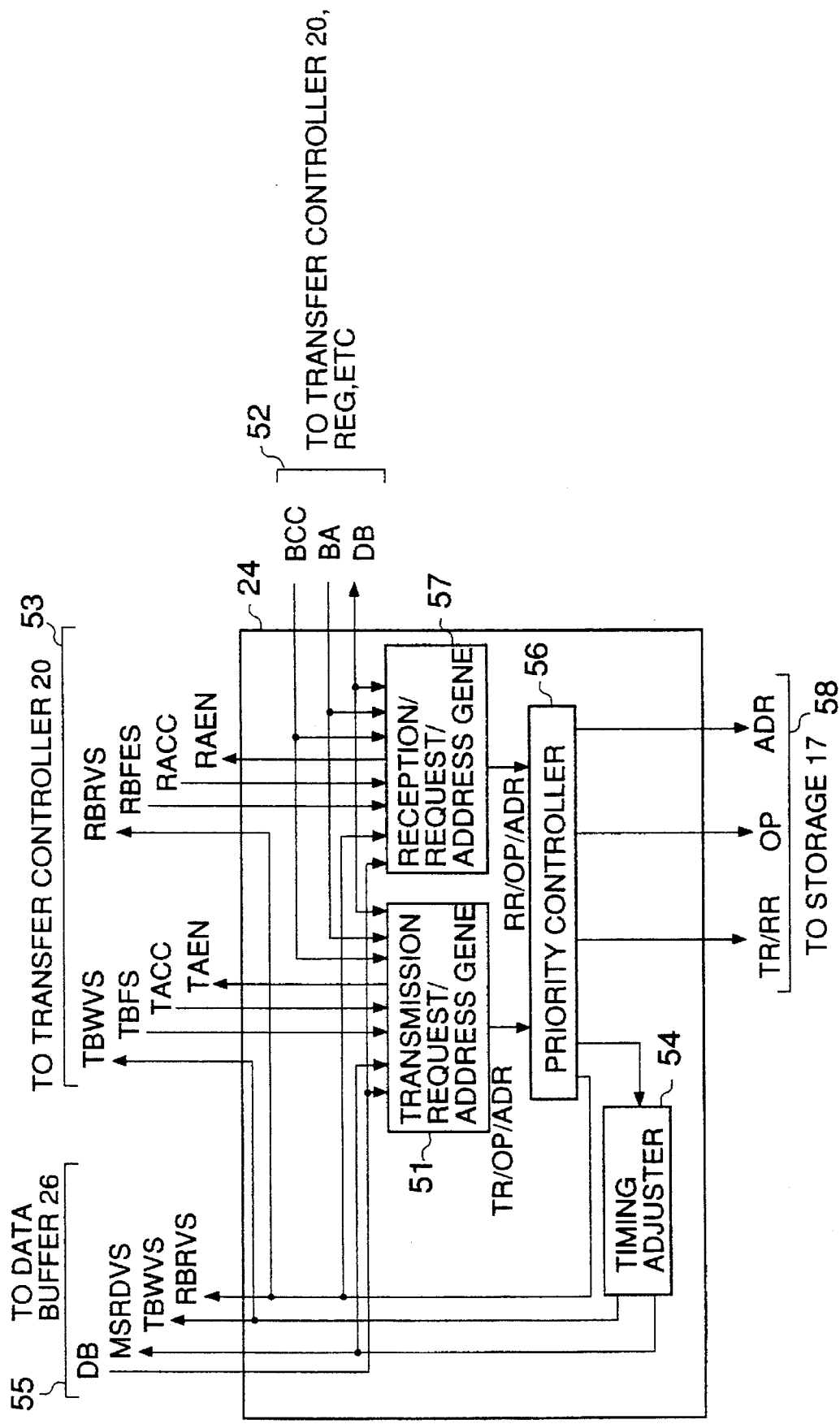
FIG. 5 is a system block diagram showing a main storage access controller of the first embodiment.

FIG. 5 shows an embodiment of the access controller 24. The access controller 24 shown in FIG. 5 includes a transmission request/address generator 51, a main storage read timing adjuster 54, a main storage access priority controller (hereinafter simply referred to as a priority controller) 56, and a reception request/address generator 57 which are coupled as shown.

In FIG. 5, the transmission request/address generator 51 is connected to the data bus and receives a bus control command BCC and a bus address BA from the transfer controller 20 via a port 52. The transmission request/address generator 51 also receives a transmission access control command TACC and a transmission buffer full signal TBFS from the transfer controller 20 via a port 53, a main storage read data valid signal MSRDVS from the timing adjuster 54, and the content of the transfer queue stored in the main storage 17 via the data buffer 26 and a port 55. The transmission request/address generator 51 generates a transmission request TR, an operation code OP and an address ADR, and supplies the same to the priority controller 56. The transmission request/address generator 51 also supplies a transmission access end notification TAEN to the transfer controller 20 via the port 53.

The reception request/address generator 57 is connected to the data bus and receives a bus control command BCC and a bus address BA from the transfer controller 20 via the port 52. The reception request/address generator 57 also receives a reception access control command RACC and a reception buffer full/empty signal RBFES from the transfer controller 20 via the port 53, a reception buffer read valid signal RBRVS from the priority controller 56, and the content of the transfer queue stored in the main storage 17 via the data buffer 26 and the port 55. The reception request/address generator 57 generates a reception request RR, an operation code OP and an address ADR, and supplies the same to the priority controller 56. The reception request/address generator 57 also supplies a reception access end notification RAEN to the transfer controller 20 via the port 53.

When the priority controller 56 receives the transmission request TR, the reception request RR and the operation code OP, the priority controller 56 selects one of them depending on the priority and supplies the selected request, operation code and address to the main storage 17 via a port 58. Normally, the reception request is selected with a priority over the transmission request. In addition, the priority controller 56 starts the timing adjuster 54, and supplies a reception buffer read valid signal RBRVS to the data buffer 26 and the transfer controller 20 via the respective ports 55 and 53.

The timing adjuster 54 generates the main storage read data valid signal MSRDVS and the transmission buffer write valid signal TBWVS when started as described above, and supplies these signals to the data buffer 26 and the transfer controller 20 via the respective ports 55 and 53.

Next, a description will be given of the operation of the transfer processor 15.

The user program writes the control information of the transfer request in the form of the header of the transfer packet at a certain address of the main storage 17. The control information includes information specifying the receiving data processing unit, the body data length, the transmitting address, the receiving address and the like. The certain address of the main storage 17 is indicated by TQBAR+TQWP×HL, where TQBAR denotes the value (or content) of the transfer queue base address register 31, TQWP denotes the value of the transfer queue write pointer 23 and HL denotes the header length. Thereafter, the value of the transfer queue write pointer 23 is incremented. Next, the user program repeats the process of writing the control information of the transfer request into the transfer queue and incrementing the transfer queue write pointer 23, and ends the enqueuing process.

Figure 6:
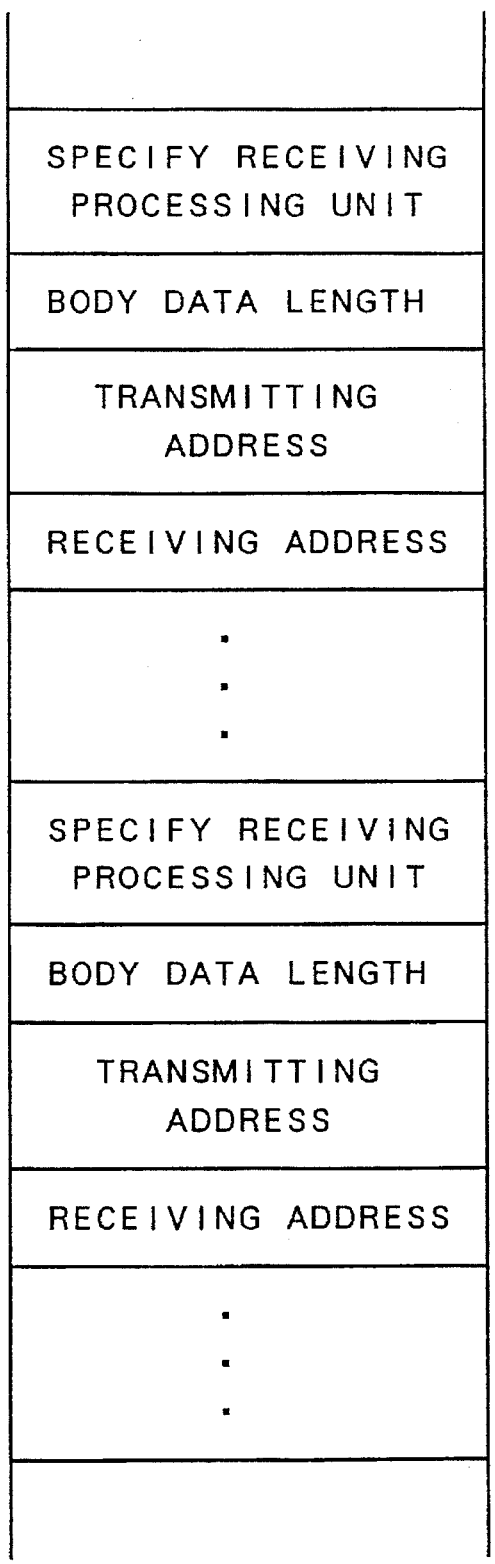
FIG. 6 is a diagram showing the construction of a transfer request queue.

Accordingly, the control information of the transfer request is stored in the transfer queue in the main storage 17 as shown in FIG. 6.

The transfer controller 20 waits for the enqueuing of the transfer request in the state where the transfer controller 20 is started by the instruction from the instruction processor 16. The transfer controller 20 recognizes that there exists a transfer request which has not yet been processed and starts the transfer process if the value of the transfer queue read pointer 22 and the value of the transfer queue write pointer 23 no longer match. In addition, the transfer controller 20 issues a main storage access request to the access controller 24 so as to read the header of the transfer packet.

As a result, the access controller 24 calculates TQBAR+TQRP×HL so as to obtain an address of the packet header of the oldest transfer request which has not yet been processed in the main storage 17, and issues a read access with respect to the main storage 17, where TQBAR denotes the value (or content) of the transfer queue base address register 31, TQRP denotes the value of the transfer queue read pointer 22 and HL denotes the header length. Hence, when the packet header is read from the main storage 17, the access controller 24 stores the read packet header in the data buffer 26 and notifies the transfer controller 20 of the end of reading the packet header.

The access controller 24 continues to obtain the control information of the transfer request from the main storage 17 via the data buffer 26, calculates the address of the body of the transfer packet, and issues a packet body read access with respect to the main storage 17. When the packet body is successively read out from the main storage 17, the access controller 24 successively stores the read packet body into the data buffer 26, and successively notifies the transfer controller 20 of the amount of packet body read.

When the end of reading the packet header is notified from the access controller 24, the transfer controller 20 obtains the control information of the transfer request from the data buffer 26. The transfer controller 20 carries out predetermined check and modification with respect to the obtained control information, and writes the checked and modified control information back into the data buffer 26.

The transfer controller 20 continues to transmit the packet header from the data buffer 26 to the network 11. Furthermore, when the amount of packet body read is successively notified from the access controller 24, the transfer controller 20 successively transmits the packet body stored in the data buffer 26 to the network 11. When the transmission of the transfer packet to the network 11 ends, the transfer controller 20 increments the transfer queue read pointer 22.

In addition, the transfer controller 20 checks the values of the transfer queue read pointer 22 and the transfer queue write pointer 23, and starts the next transfer process if there remains a transfer request which has not yet been processed.

If a failure such as a program exception related to the transfer process or a hardware damage is detected during the above described transfer process, the transfer controller 20 sets the interrupt display flag in the failure display register 30 and also writes the state of the detected failure. Thereafter, during a time in which the interrupt display flag is set, obtaining a transfer request and carrying out a transfer process are prohibited even if the transfer request is enqueued in the transfer request queue.

When the user program which is executed by the instruction processor 16 detects that the interrupt display flag is set in the failure display register 30, the user program analyzes the cause of the transfer failure from the state of the failure written in the failure display register 30 and the like. If a recovery process is possible, the remaining transfer request is erased, and the values of the transfer queue read pointer 22 and the transfer queue write pointer 23 are modified accordingly. Then, the user program erases the content of the failure display register 30 and carries out a failure recovery process.

When the failure recovery is possible, the transfer processor 15 executes the remaining transfer process after detecting the erasure of the failure display register 30 because the transfer request which has not yet been processed remains.

Accordingly, if the failure such as program exception or hardware damage is generated during the transfer process, the transfer process which obtains the transfer request from the transfer request queue is prohibited by the display of the failure, and this prohibition is cancelled after the failure is recovered. For this reason, even when a plurality of packets are transferred by a single transfer request and the transfer of an intermediate packet is suppressed due to the failure such as program exception or hardware damage that occurs during transfer of this intermediate packet, the transfer of the packet following this intermediate packet is prohibited. When the failure is recovered, the transfer of the intermediate packet and the following packets is resumed or, the transfer request is erased, so that the receiving data processing unit will not erroneously recognize an end of the transfer request.

Figure 7:
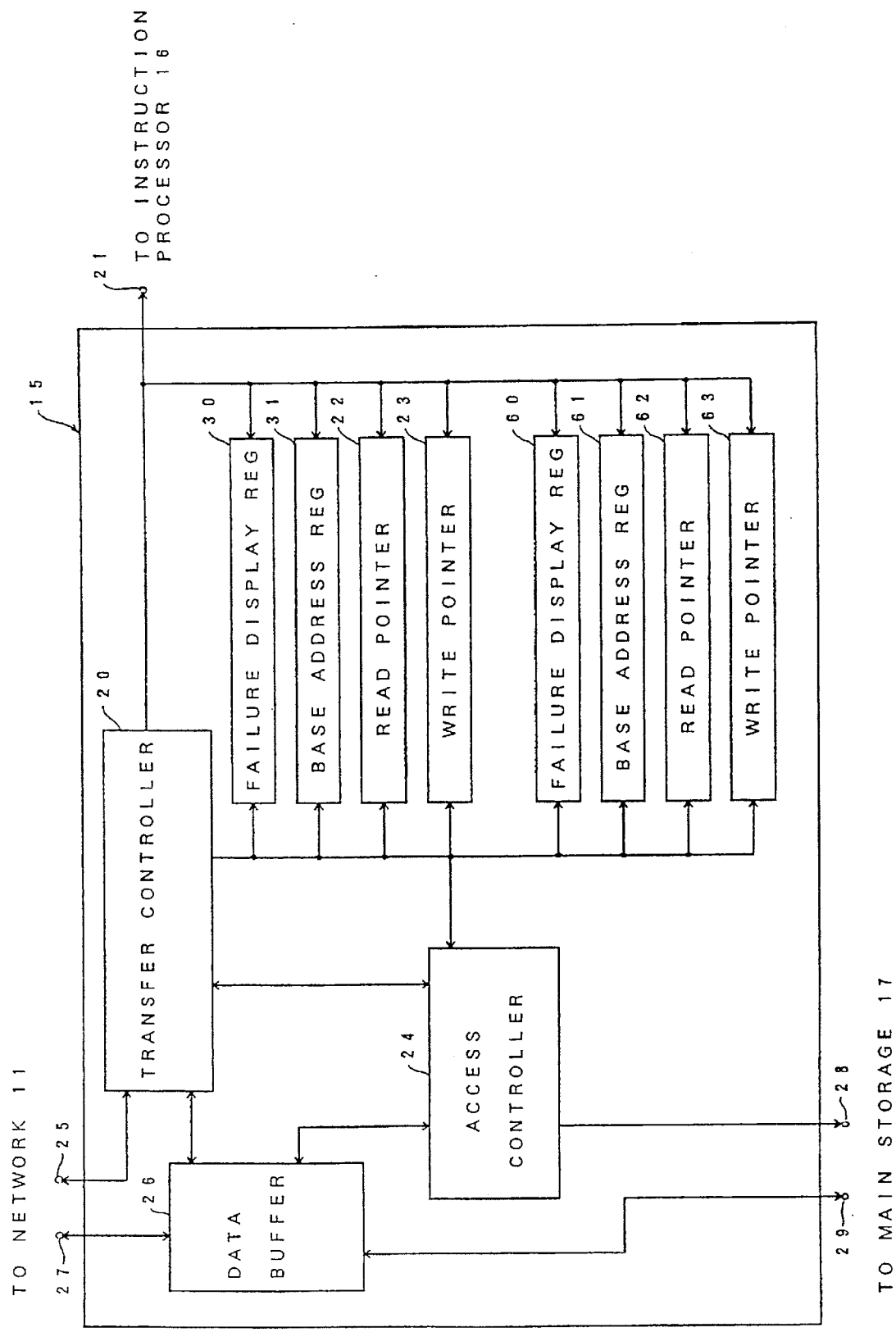
FIG. 7 is a system block diagram showing a transfer processor of a second embodiment of the data processing according to the present invention.

FIG. 7 shows an essential part of a second embodiment of the data processing unit according to the present invention. More particularly, FIG. 7 shows the transfer processor 15 of the second embodiment. In FIG. 7, those parts which are the same as those corresponding parts in FIG. 3 are designated by the same reference numerals, and a description thereof will be omitted.

The transfer processor 15 shown in FIG. 7 includes the transfer controller 20, the transfer queue read pointer 22, the transfer queue write pointer 23, the access controller 24, the data buffer 26, the failure display register 30, the transfer queue base address register 31, a failure display register 60, a transfer queue base address register 61, a transfer queue read pointer 62, and a transfer queue write pointer 63 which are coupled as shown.

The transfer processor 15 shown in FIG. 7 additionally includes the failure display register 60, the transfer queue base address register 61, the transfer queue read pointer 62, and the transfer queue write pointer 63 when compared to the transfer processor 15 shown in FIG. 3. In other words, two failure display registers 30 and 60, two transfer queue base address registers 31 and 61, two transfer queue read pointers 22 and 62, and two transfer queue write pointers 23 and 63 are provided, and these elements are coupled to and are accessible by the instruction processor 16, the transfer controller 20 and the access controller 24 via buses.

In this embodiment, two transfer request queues are provided in the main storage 17, and the transfer processes are carried out independently using the respective transfer request queues. For example, when a failure such as a program exception or hardware damage related to the transfer process of a first one of the two transfer request queues corresponding to the failure display register 60 is detected, the interrupt display flag is set in the failure display register 60 and the state of the failure is written, so that the transfer process using the first transfer request queue is prohibited during the time in which the interrupt display flag is set. However, if the transfer request is enqueued in the other second one of the two transfer request queues corresponding to the failure display register 30, the transfer process is carried out by obtaining the transfer request from the second transfer request queue as long as the interrupt display flag is not set in the failure display register 30. With regard to the transfer request of the first transfer request queue in which the failure is generated, the instruction processor 16 corrects the control information of the transfer request and enqueues the transfer request with the corrected control information or, a failure recovery process is carried out to erase the remaining transfer request, similarly to the first embodiment.

By providing a failure display means in correspondence with each of the plurality of transfer request queues, it becomes possible to prohibit the transfer process of the transfer request in the transfer request queue which corresponds to the failure display means in which the failure is displayed. On the other hand, the transfer process of the transfer request in the transfer request queues in which no failure is generated can be continued. As a result, it is possible to prevent the receiving data processing unit from erroneously recognizing an end of the transfer request even if a failure is generated during transfer of a plurality of packets by a single transfer request, while effectively utilizing the network.

Figure 8:
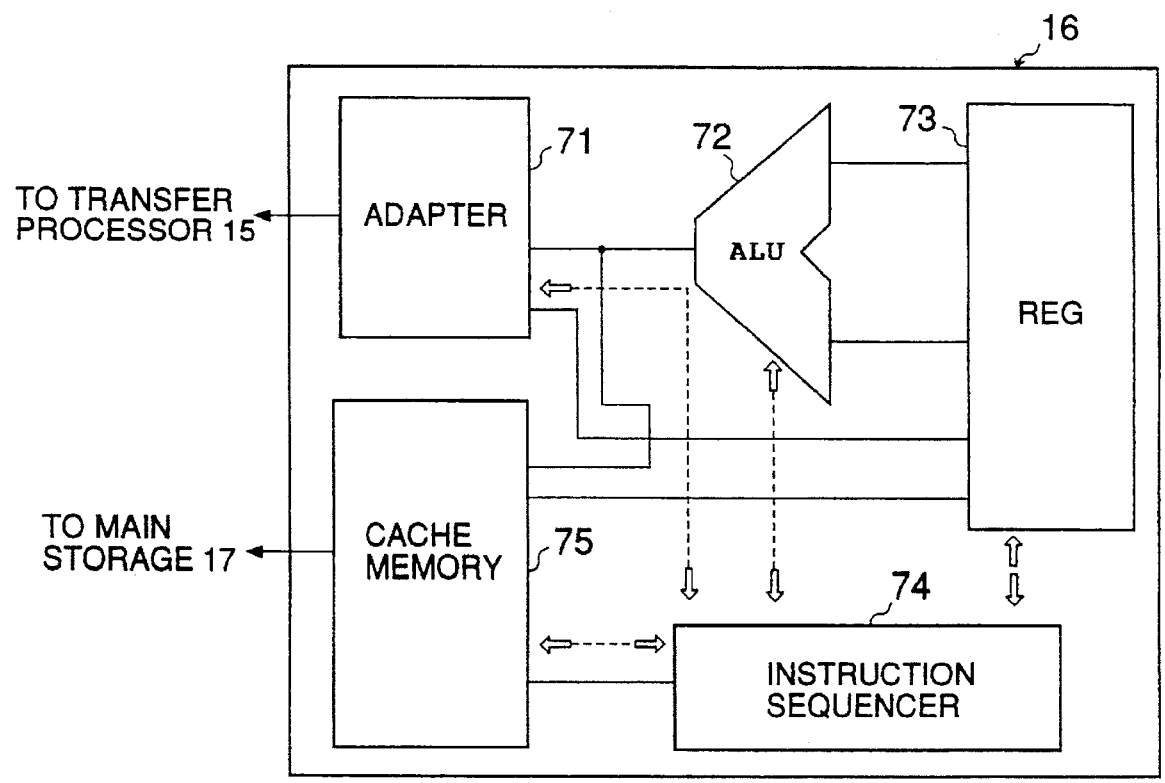
FIG. 8 is a system block diagram showing an embodiment of an instruction processor of the data processing unit.

Next, a description will be given of the construction of the instruction processor 16 shown in FIG. 2, by referring to FIG. 8. FIG. 8 shows an embodiment of the instruction processor 16, and for the sake of convenience, it will be assumed that this instruction processor 16 is used in the first embodiment of the data processing unit according to the present invention.

The instruction processor 16 shown in FIG. 8 includes a transfer processor adapter 71, an arithmetic logic unit (ALU) 72, a general purpose register 73, an instruction sequencer 74, and a cache memory 75 which are coupled as shown. The instruction processor 16 reads and executes the instructions (programs) stored in the main storage 17, as described above. In FIG. 8, the data bus is indicated by solid line, and the control signal is indicated by a dotted line.

The instruction sequencer 74 has an internal program counter, and reads an instruction from the cache memory 75 based on an address specified by the internal program counter. The instruction sequencer 74 decodes the instruction and supplies necessary control signals to other parts of the instruction processor 16. After the execution of the instruction ends, the instruction sequencer 74 updates the value of the internal program counter, and starts processing the following instruction.

The cache memory 75 stores a copy of a portion of the main storage 17. The cache memory 75 supplies the instruction to the instruction sequencer 74 depending on the control signal from the instruction sequencer 74, and supplies data to the register 73. If the requested data are not stored in the cache memory 75, the requested data is read from the main storage 17 and stored in the cache memory 75. The cache memory 75 also stores the data from the register 73 depending on the control signal from the instruction sequencer 74, and writes the stored data into the main storage 17.

The register 73 receives and stores data from the cache memory 75, the ALU 72 and the transfer processor adapter 71 depending on the control signal from the instruction sequencer 74. The register 73 also supplies data to be subjected to an operation to the ALU 72, and stores data into the cache memory 75.

The ALU 72 carries out an operation on the data supplied from the register 73 depending on the control signal from the instruction sequencer 74. The ALU 72 supplies a result of this operation to the register 73 and the transfer processor adapter 71.

The transfer processor adapter 71 transmits a start/stop command SSC to the transfer processor 15 depending on the control signal from the instruction sequencer 74. In addition, the transfer processor adapter 71 uses the data from the ALU 72 and carries out a read/write operation with respect to the registers/pointers within the transfer processor 15 depending on the control signal from the instruction sequencer 74. The transfer processor adapter 71 transfers the data read from the registers/pointers within the transfer processor 15 to the register 73 depending on the control signal from the instruction sequencer 74. Furthermore, the transfer processor adapter 71 transfers an interrupt signal from the transfer processor 15 to the instruction sequencer 74.

Of course, the instruction processor 16 used in the second embodiment of the data processing unit according to the present invention may be constructed similarly to that shown in FIG. 8.

When transferring the content of the storage region of an arbitrary data processing unit to another data processing unit in the conventional parallel computer system, the queuing of the data transfers with respect to the other data processing unit is managed by a supervisor program. Hence, the user program of the data processing unit generates an interrupt of the data transfer request with respect to the supervisor program, and the supervisor program in general forms the header and instructs the transfer.

However, this method employed in the conventional parallel computer system generates a large number interrupts, and the overhead becomes large. For this reason, it is desirable to provide the write pointer and the read pointer in the transfer queue, and to make the user program directly manage these pointers so as to reduce the overhead caused by the intervention of the supervisor program.

But in order to enqueue the transfer requests and to know the end of the transfer by the transfer processor, the user program must carry out a polling of the read pointer. In addition, if a plurality of transfer requests exist, it is necessary to hold an end discriminating value within the user program because the value of the read pointer for discriminating the end of the transfer request is dependent on the value of the write pointer at a time when the enqueuing started.

In addition, if the transfer request queue is used in a wrap-around manner, the end of the transfer cannot be discriminated if the read pointer overruns by the wrap-around. As a result, additional control information is required for the enqueuing of the transfer requests and the discrimination of the end of the transfer, thereby making the algorithm complex.

Next, a description will be given of third and fourth embodiments of the data processing units according to the present invention, in which these problems are eliminated. More particularly, the third and fourth embodiments do not require the additional information for discriminating the end of the transfer and the algorithm is simple. Further, unwanted increase in the overhead of the instruction processor can be suppressed.

Figure 9:
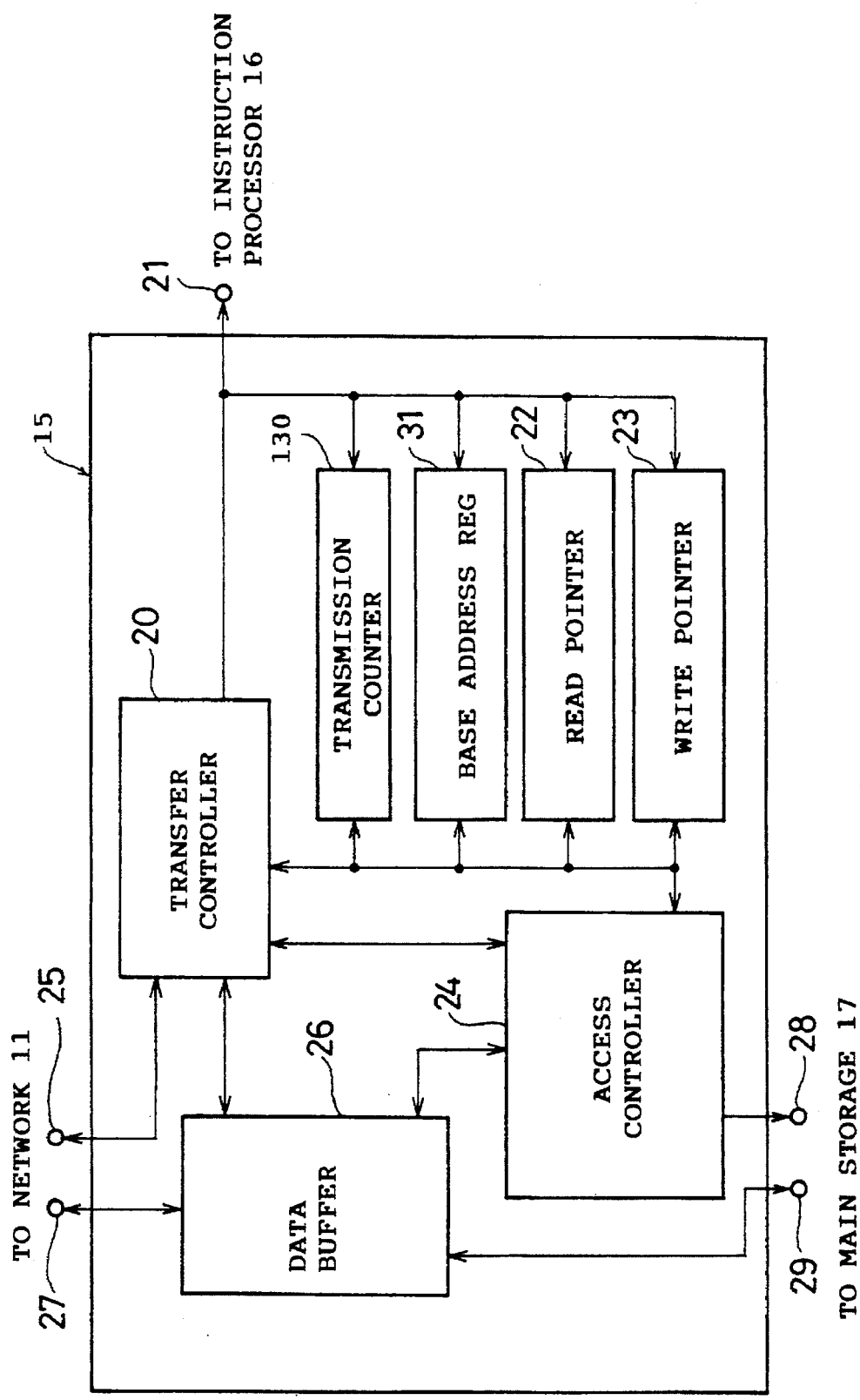
FIG. 9 is a system block diagram showing an essential part of a third embodiment of the data processing unit according to the present invention.

FIG. 9 shows an essential part of the third embodiment. More particularly, FIG. 9 shows the transfer processor 15 of the third embodiment. In FIG. 9, those parts which are basically the same as those corresponding parts in FIG. 3 are designated by the same reference numerals, and a description of the same parts will be omitted.

In FIG. 9, the transfer controller 20 is started by an instruction which is obtained from the instruction processor 16 via the port 21. The transfer controller 20 starts the transfer process depending on the values of the transfer queue read pointer 22 and the transfer queue write pointer 23. The transfer controller 20 issues a main storage access request to the access controller 24 so as to read the header and body data of the transfer packet, and controls the interface which couples the transfer processor 15 to the network 11 via the port 25 and transmits the transfer packet from the data buffer 26 to the network 11 via the port 27. In addition, at the end of the transfer, the transfer controller 20 increments the transfer queue read pointer 22 and decrements a transmission counter 130.

The transmission counter 130 manages the number of times the processes of the transfer requests ended. The instruction processor 16 can make a reference to and modify the content of the transmission counter 130.

Figure 10:
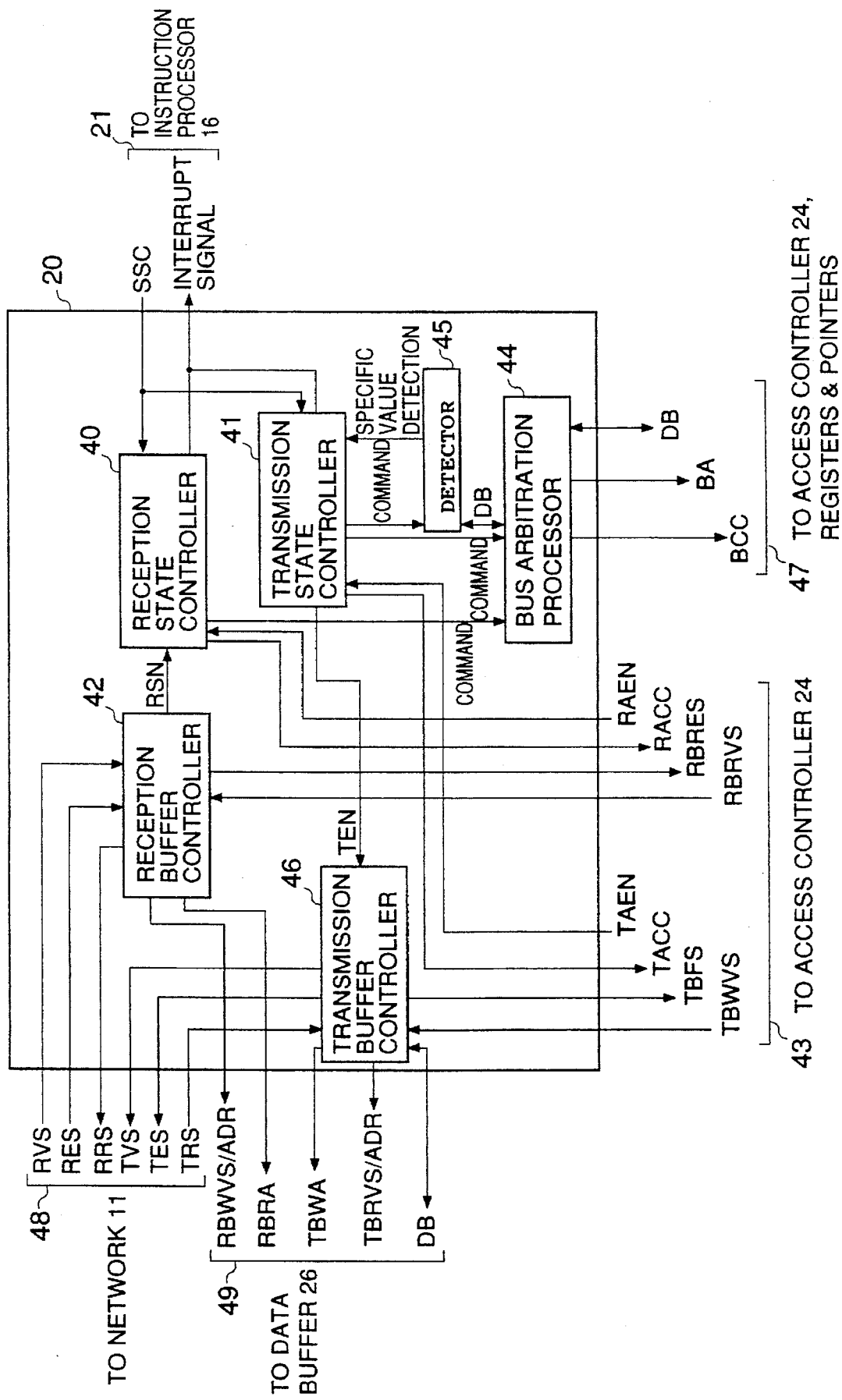
FIG. 10 is a system block diagram showing a transfer controller of the third embodiment.

FIG. 10 shows an embodiment of the transfer controller 20 shown in FIG. 9. In FIG. 10, those parts which are basically the same as those corresponding parts in FIG. 4 are designated by the same reference numerals, and a description of the same parts will be omitted. The transfer controller 20 shown in FIG. 10 includes a transmission counter update/specific value detector (hereinafter simply referred to as a detector) 45 in addition to those elements shown in FIG. 4.

The reception state controller 40 supplies to the bus arbitration processor 44 read/write commands R/W of the counter, register, and pointers which are coupled via the port 47.

In addition to the start/stop command SSC, the transmission state controller 41 also receives a specific value detection signal SVDS from the detector 45 and a transmission access end notification TAEN from the access controller 24 via the port 43, and manages the transmission state. The transmission state controller 41 supplies to the bus arbitration processor 44 the read/write commands R/W of the counter, register and pointers which are coupled via the port 47.

The bus arbitration processor 44 carries out an arbitration of commands received from the reception state controller 40 and the transmission state controller 41, and supplies a bus control command BCC, a bus address BA and data D to a bus via the port This bus is coupled to the transmission counter 130, the transfer queue base address register 31, the transfer queue read pointer 22, the transfer queue write pointer 23, and the access controller The detector 45 makes an access to the transmission counter 130 via the port 47 under arbitration of the bus arbitration processor 44, and updates the transmission counter 130. In addition, the detector 45 supplies a specific value detection signal SVDS to the transmission state controller 41 when the value of the transmission counter 130 becomes a specific value which is "0", for example.

The access controller 24 shown in FIG. 9 may have the same construction as the access controller 24 shown in FIG. 5.

The operation of the transfer processor 15 is basically the same as that of the first embodiment described above.

But in this embodiment, the user program writes into the transmission counter 130 the number of transfer requests to be enqueued, prior to enqueuing the transfer requests. Then, the user program writes the control information of the transfer request in the form of the header of the transfer packet at a certain address of the main storage 17. The control information includes information specifying the receiving data processing unit, the body data length, the transmitting address, the receiving address and the like. The certain address of the main storage 17 is indicated by TQBAR+TQWPxHL, where TQBAR denotes the value (or content) of the transfer queue base address register 31, TQWP denotes the value of the transfer queue write pointer 23 and HL denotes the header length, as described above. Thereafter, the value of the transfer queue write pointer 23 is incremented. Next, the user program repeats the process of writing the control information of the transfer request into the transfer queue and incrementing the transfer queue write pointer 23, and ends the enqueuing process.

Accordingly, the control information of the transfer request is stored in the transfer queue in the main storage 17 as shown in FIG. 6 described above.

When the amount of packet body read is successively notified from the access controller 24, the transfer controller 20 successively transmits the packet body stored in the data buffer 26 to the network 11. When the transmission of the transfer packet to the network 11 ends, the transfer controller 20 increments the transfer queue read pointer 22 and decrements the transmission counter 130.

In addition, the transfer controller 20 checks the values of the transfer queue read pointer 22 and the transfer queue write pointer 23, and starts the next transfer process if there remains a transfer request which has not yet been processed.

Therefore, when the transfer processes of the transfer requests enqueued first all end, the value of the transmission counter 130 becomes "0". The user program can recognize the end of all transfer processes of the enqueued transfer requests when the value of the transmission counter 130 becomes "0" by occasionally polling the transmission counter 130 while carrying out another process during this time.

Accordingly, by setting a value corresponding to the number of transfer requests in the transmission counter 130 from the instruction processor 16 prior to enqueuing the transfer requests and updating the value of the transmission counter 130 every time the transfer process of the transfer request is carried out, the instruction processor 16 can be aware of the end of the transfer process by the transfer processor 15 by simply monitoring the value of the transmission counter 130. In addition, since the value of the transmission counter 130 is independent of the state of use of the transfer queue, it is unnecessary to hold the end discriminating value described above.

Figure 11:
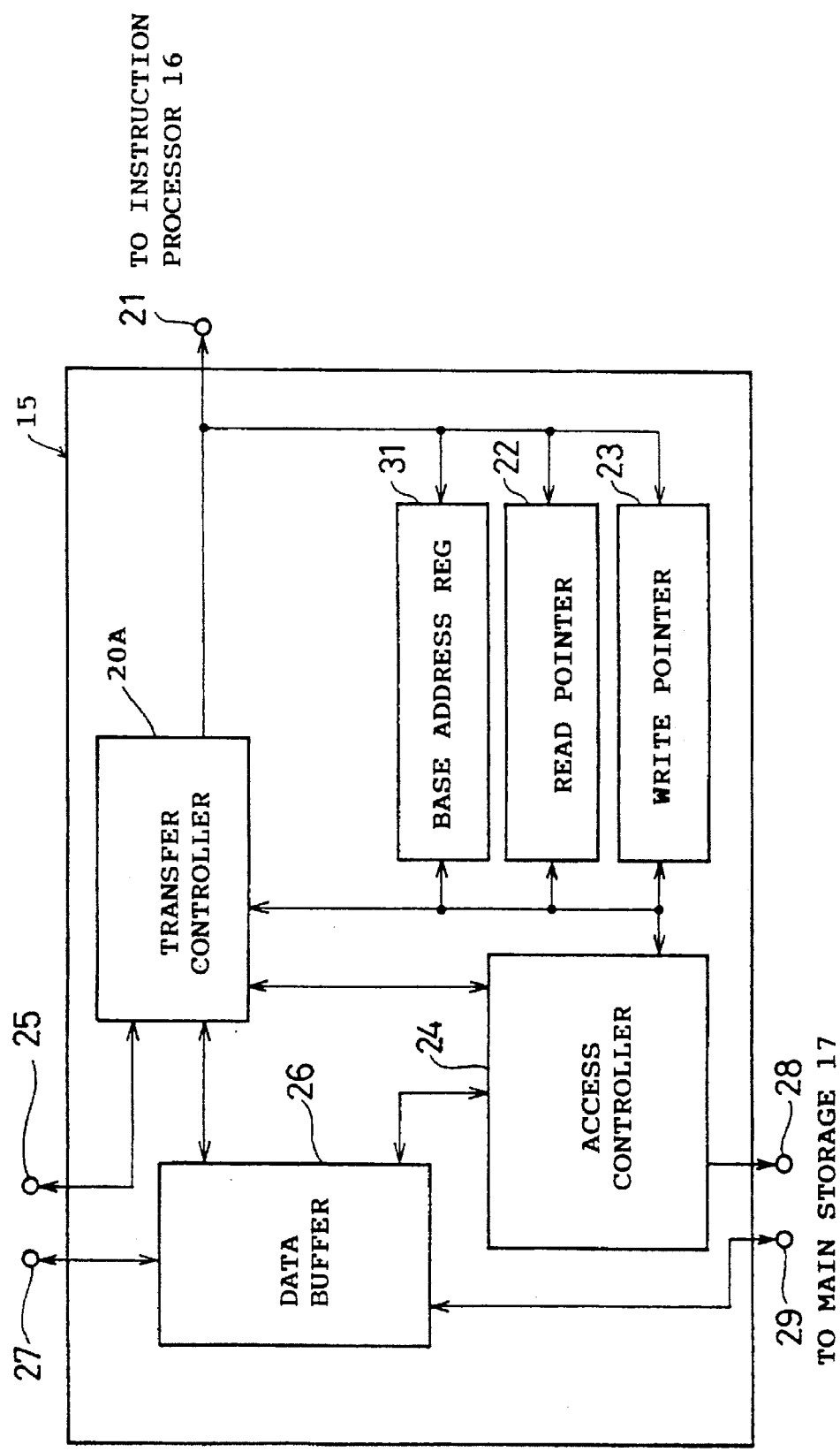
FIG. 11 is a system block diagram showing an essential part of a fourth embodiment of the data processing unit according to the present invention.

Next, a description will be given of the fourth embodiment, by referring to FIGS. 11 through 13. FIG. 11 shows an embodiment of the transfer processor 15 of the fourth embodiment. In FIG. 11, those parts which are the same as those corresponding parts in FIG. 9 are designated by the same reference numerals, and a description thereof will be omitted.

In this fourth embodiment, no transmission counter is provided as may be seen from FIG. 11. Instead, a transfer controller 20A of the transfer processor 15 has the construction shown in FIG. 12. In FIG. 12, those parts which are the same as those corresponding parts in FIG. 10 are designated by the same reference numerals, and a description thereof will be omitted.

Figure 12:
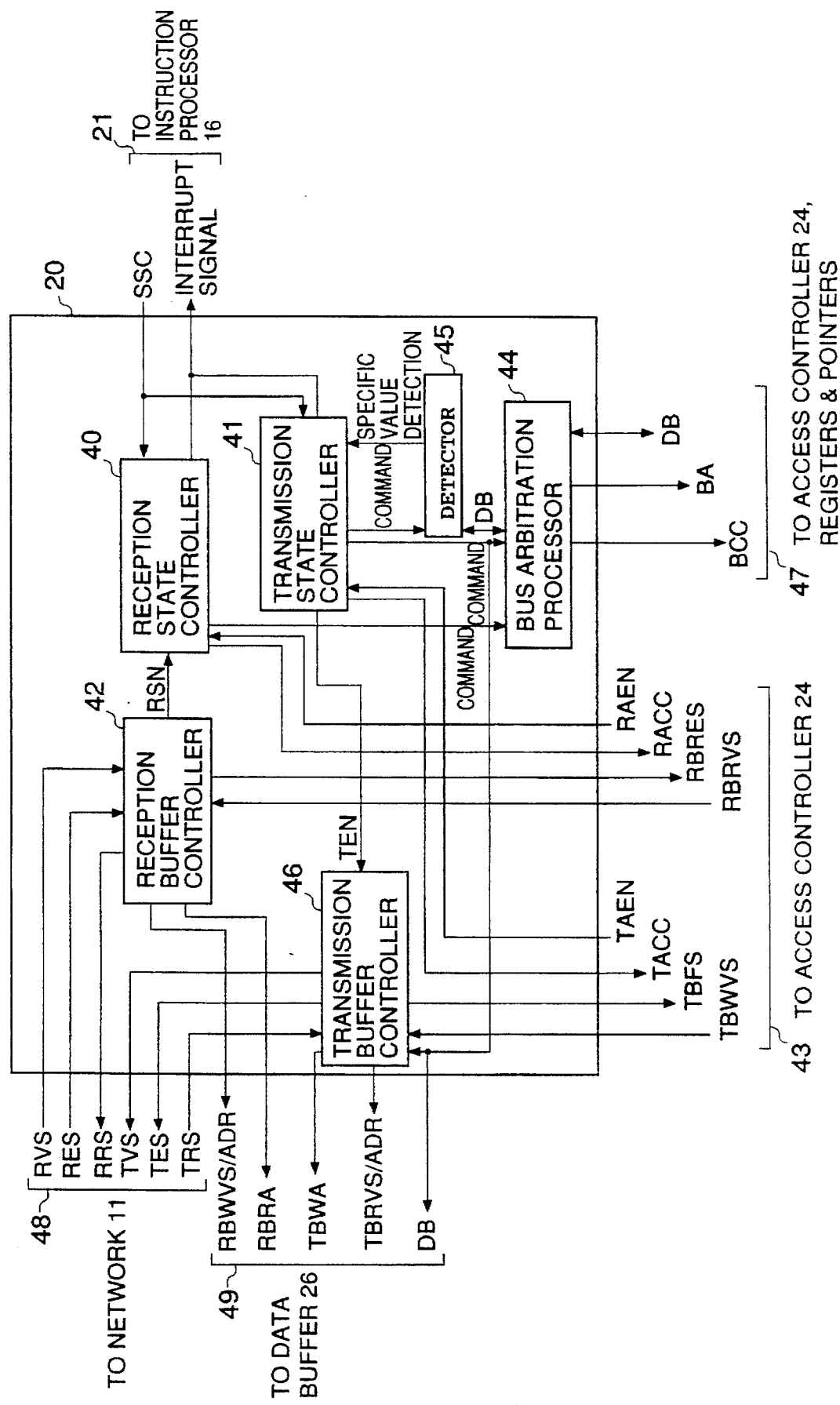
FIG. 12 is a system block diagram showing a transfer controller of the fourth embodiment.

As shown in FIG. 12, the detector 45 is coupled to the data buffer 26 via the data bus and the port 49. In addition, the transmission counter in this embodiment is provided in the main storage 17.

The transfer processor 15 of this fourth embodiment operates as follows.

Prior to enqueuing the transfer requests, the user program writes the number of transfer requests to be enqueued into the transmission counter within the main storage 17. The user program writes the control information of the transfer request in the form of the header of the transfer packet at a certain address of the main storage 17. The control information includes information specifying the receiving data processing unit, the body data length, the transmitting address, the receiving address and the like. The certain address of the main storage 17 is indicated by TQBAR+TQWPxHL, where TQBAR denotes the value (or content) of the transfer queue base address register 31, TQWP denotes the value of the transfer queue write pointer 23 and HL denotes the header length. Thereafter, the value of the transfer queue write pointer 23 is incremented. Next, the user program repeats the process of writing the control information of the transfer request into the transfer queue and incrementing the transfer queue write pointer 23, and ends the enqueuing process.

Figure 13:
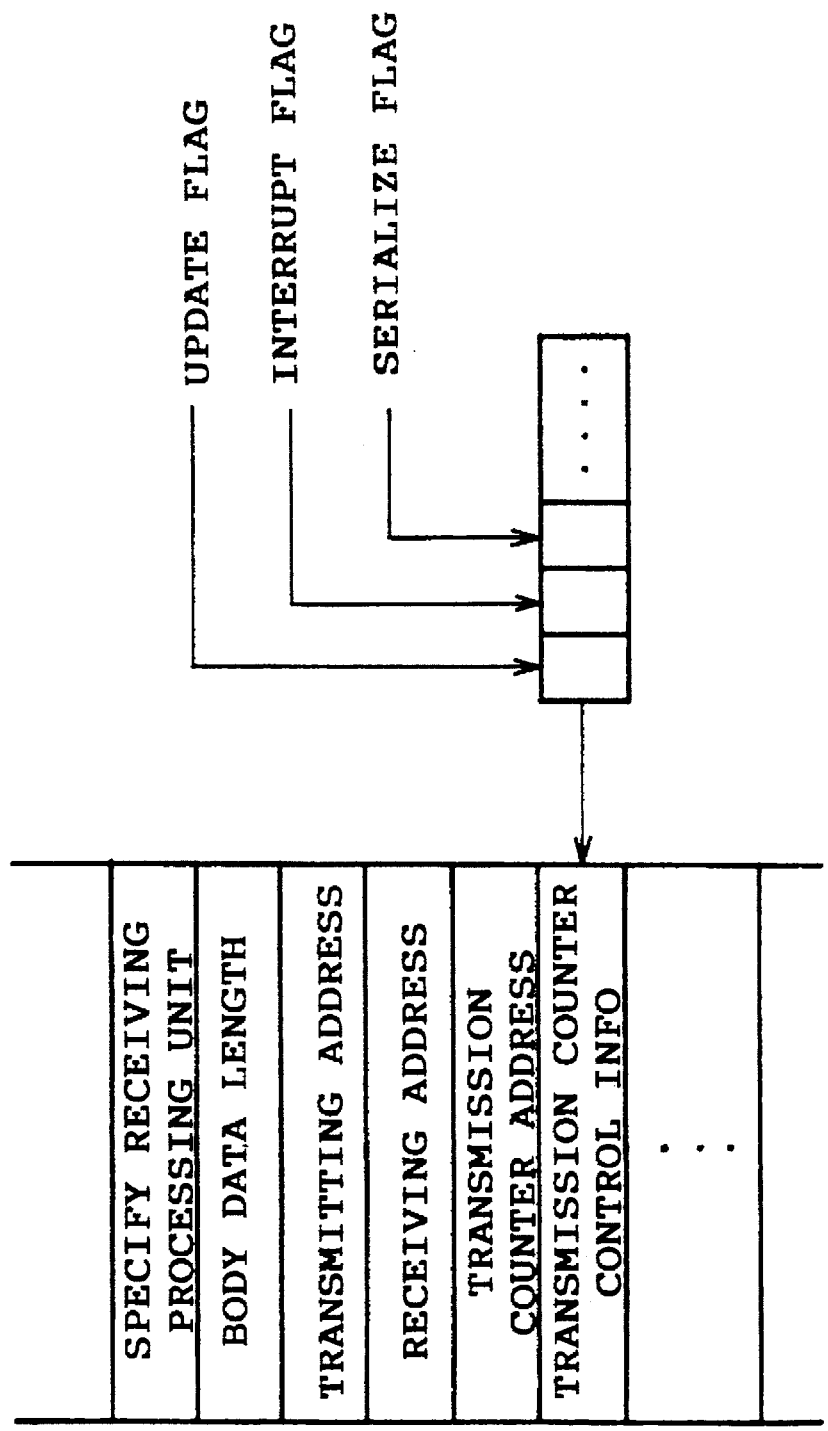
FIG. 13 is a diagram for explaining the construction of a transfer request queue used in the fourth embodiment.

Accordingly, the control information of the transfer request is stored in the transfer queue in the main storage 17 as shown in FIG. 13. In FIG. 13, a transmission counter address is the address where the transmission counter is stored in the main storage Transmission counter control information includes an update flag which specifies whether or not to update the transmission counter, an interrupt flag which specifies whether or not to make an interrupt when is detected that the value of the transmission counter is the specific value, and a serialize flag which specifies whether or not to serialize access to the main storage 17 prior to updating the transmission counter.

The transfer controller 20A waits for the enqueuing of the transfer request in the state where the transfer controller 20A is started by the instruction from the instruction processor 16. The transfer controller 20A recognizes that there exists a transfer request which has not yet been processed and starts the transfer process if the value of the transfer queue read pointer 22 and the value of the transfer queue write pointer 23 no longer match. In addition, the transfer controller 20A issues a main storage access request to the access controller 24 so as to read the header of the transfer packet.

As a result, the access controller 24 calculates TQBAR+ TQRP×HL so as to obtain an address of the packet header of the oldest transfer request which has not yet been processed in the main storage 17, and issues a read access with respect to the main storage 17, where TQBAR denotes the value (or content) of the transfer queue base address register 31, TQRP denotes the value of the transfer queue read pointer 22 and HL denotes the header length. Hence, when the packet header is read from the main storage 17, the access controller 24 stores the read packet header in the data buffer 26 and notifies the transfer controller 20A of the end of reading the packet header.

The access controller 24 continues to obtain the control information of the transfer request from the main storage 17 via the data buffer 26, calculates the address of the body of the transfer packet, and issues a packet body read access with respect to the main storage 17. When the packet body is successively read out from the main storage 17, the access controller 24 successively stores the read packet body into the data buffer 26, and successively notifies the transfer controller 20A of the amount of packet body read.

When the end of reading the packet header is notified from the access controller 24, the transfer controller 20A obtains the control information of the transfer request from the data buffer 26. The transfer controller 20A carries out predetermined check and modification with respect to the obtained control information, and writes the checked and modified control information back into the data buffer 26.

The transfer controller 20A continues to transmit the packet header from the data buffer 26 to the network 11. Furthermore, when the amount of packet body read is successively notified from the access controller 24, the transfer controller 20A successively transmits the packet body stored in the data buffer 26 to the network 11. When the transmission of the transfer packet to the network 11 ends, the transfer controller 20A increments the transfer queue read pointer 22 and checks the update flag within the transmission counter control information of the packet header. The transfer controller 20A instructs reading of the transmission counter with respect to the access controller 24 if the update flag is ON.

The access controller 24 obtains the transmission counter address within the packet header which is held, and issues a read access with respect to the main storage 17. When the transmission counter is read from the main storage 17, the access controller 24 stores the read transmission counter in the data buffer 26, and notifies the transfer controller 20A of the end of reading the transmission counter. When the transfer controller 20A is notified of the end of reading the transmission counter from the access controller 24, the transfer controller 20A obtains the transmission counter from the data buffer 26, decrements the transmission counter, and writes the decremented transmission counter back into the data buffer 26. In addition, the transfer controller 20A instructs writing of the transmission counter with respect to the access controller 24.

In this state, the transfer controller 20A checks the serialize flag within the transmission counter control information of the packet header, and instructs the access controller 24 to make an access with a serialize request if the serialize flag is ON. The access controller 24 issues an access with or without the serialize request with respect to the main storage 47, depending on the instruction from the transfer controller 20A. The access controller 24 also obtains the updated transmission counter from the data buffer 26 and supplies the same to the main storage 17. When the writing to the main storage 17 ends, the access controller 24 notifies the transfer controller 20A of the end of writing the transmission counter.

In response to this notification from the access controller 24, the transfer controller 20A checks the interrupt flag within the transmission counter control information of the packet header. The transfer controller 20A generates an interrupt with respect to the instruction processor 16 if the interrupt flag is ON and the value of the decremented transmission counter is "0" If these two conditions are not satisfied, the transfer controller 20A checks the values of the transfer queue read pointer 22 and the transfer queue write pointer 23, and starts the next transfer process if there remains a transfer request which has not yet been processed.

Therefore, when the transfer processes of the transfer requests enqueued first all end and the update flag is ON in these transfer requests, the value of the transmission counter becomes "0". The user program can recognize the end of all transfer processes of the enqueued transfer requests when the value of the transmission counter becomes "0" by occasionally polling the transmission counter while carrying out another process during this time. In addition, if the serialize flag is turned ON in these transfer requests and the value of the transmission counter becomes "0", it is guaranteed that the main storage accesses of the transfer processor 15 made before the value of the transmission counter became "0" have all ended when viewed from the instruction processor 18. Furthermore, if the interrupt flag of these transfer requests are turned ON, there is no need to make the polling of the transmission counter.

Accordingly, by providing a plurality of such transmission counters in the main storage 17, it is possible to assign an independent transmission counter to each transfer queue when a plurality of transfer queues exist, so as to manage a plurality of transfer requests in parallel and to prevent the increase of the hardware.

In addition, by including the address of the transmission counter in the main storage 17 within the control information of the transfer request, it is possible to arbitrarily set a plurality of transmission counters in the main storage 17.

Moreover, by providing the update flag, it is possible to prevent an unnecessary increase in the overhead when the transfer is made using an algorithm which does not require the use of the transmission counter.

Furthermore, by providing the serialize flag, the user program can regard that a transfer process and the related updating of the content of the main storage have ended when the transfer ends, without being conscious of the matching between the content of the cache memory within the instruction processor and the content of the main storage. In addition, with respect to a transfer process such as an intermediate portion of the transfer request stream that does not require serialized access to the main storage, the serialize flag can be turned OFF so as to prevent an unnecessary increase of the overhead caused by the serialized access.

On the other hand, by providing the interrupt flag, there is no need for the user program to monitor the transmission counter, thereby reducing the overhead of polling the transmission counter. Moreover, since the user program can arbitrarily select the direct monitoring of the transmission counter and the interrupt, it is possible to carry out a flexible control by making the direct monitoring when the number of transfer requests to be queued is small and by using the interrupt when the number of transfer requests to be queued is large.

In the third and fourth embodiments described above, the transmission counter is provided with respect to the packet transmission. However, it is possible to similarly provide a reception counter with respect to the packet reception.

On the other hand, according to the third and fourth embodiments, the polling of the transmission counter is necessary. If the supervisor program were to make this polling of the transmission counter, the overhead of the supervisor program would increase. Since the user program makes this polling of the transmission counter in the third and fourth embodiments, such an increase of the overhead of the supervisor program is prevented. However, when the user program makes the polling of the transmission counter, the instruction processor must carry out a spin loop until the value of the transmission counter reaches a specific value ("0" in the above described case), and the load on the instruction processor increases.

In addition, when the instruction processor carries out the spin loop and particularly in the case where one data processing unit is to carry out one parallel process and another process, the execution of the other process must wait even if executable while the parallel process is in the spin loop waiting for the value of the transmission counter to reach the specific value.

Next, a description will be given of a fifth embodiment of the data processing unit according to the present invention which eliminates the need for the polling of the transmission counter, by referring to FIGS. 14 and 15.

Figure 14:
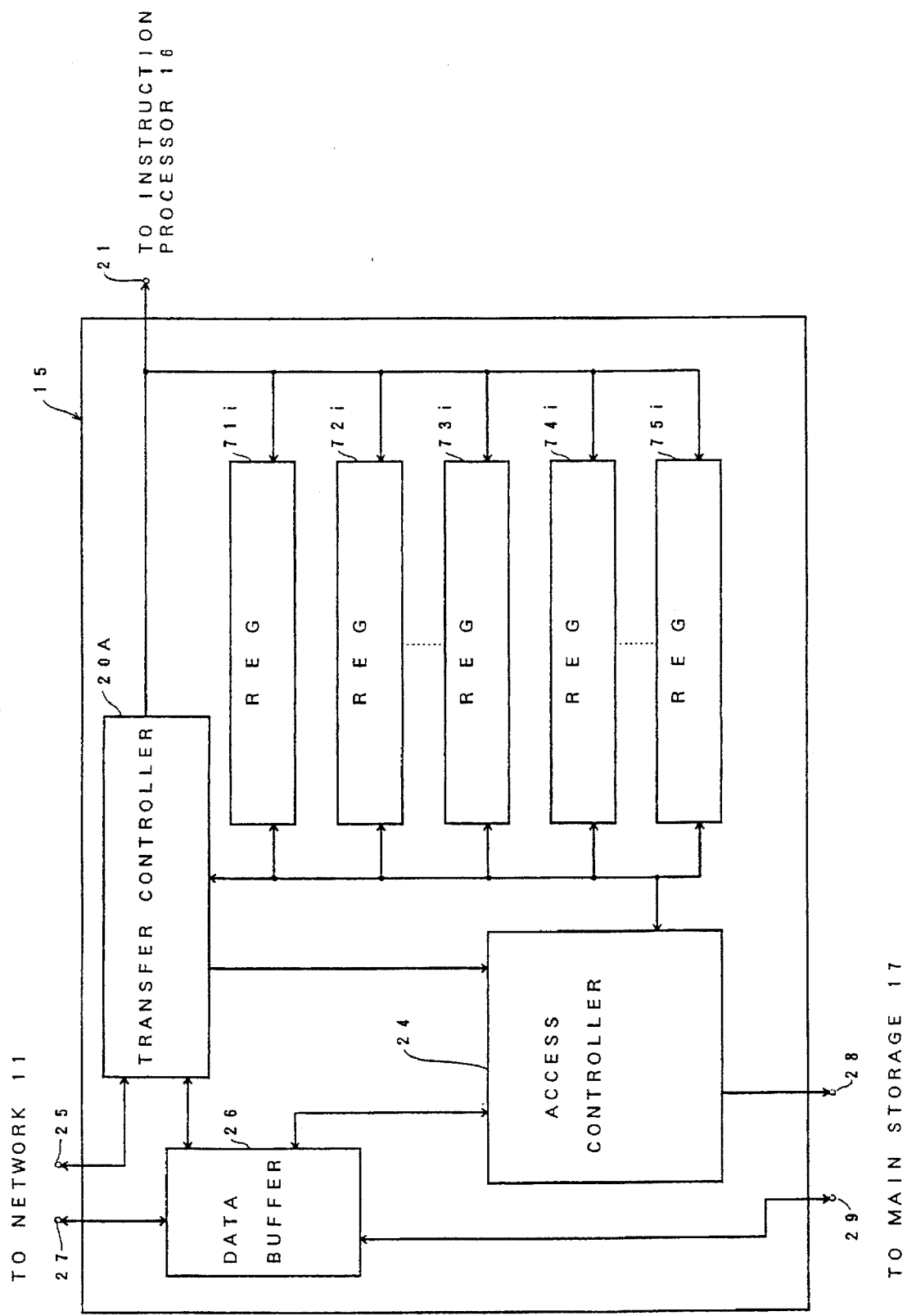
FIG. 14 is a system block diagram showing an essential part of a fifth embodiment of the data processing unit according to the present invention.

FIG. 14 shows an essential part of the fifth embodiment. More particularly, FIG. 14 shows an embodiment of the transfer processor 15 of the fifth embodiment. In FIG. 14, those parts which are the same as those corresponding parts in FIG. 11 are designated by the same reference numerals, and a description thereof will be omitted. Further, for the sake of convenience, the illustration of the transfer queue base address register 31, the transfer queue read pointer 22 and the transfer queue write pointer 23 will be omitted in FIG. 14.

Figure 15:
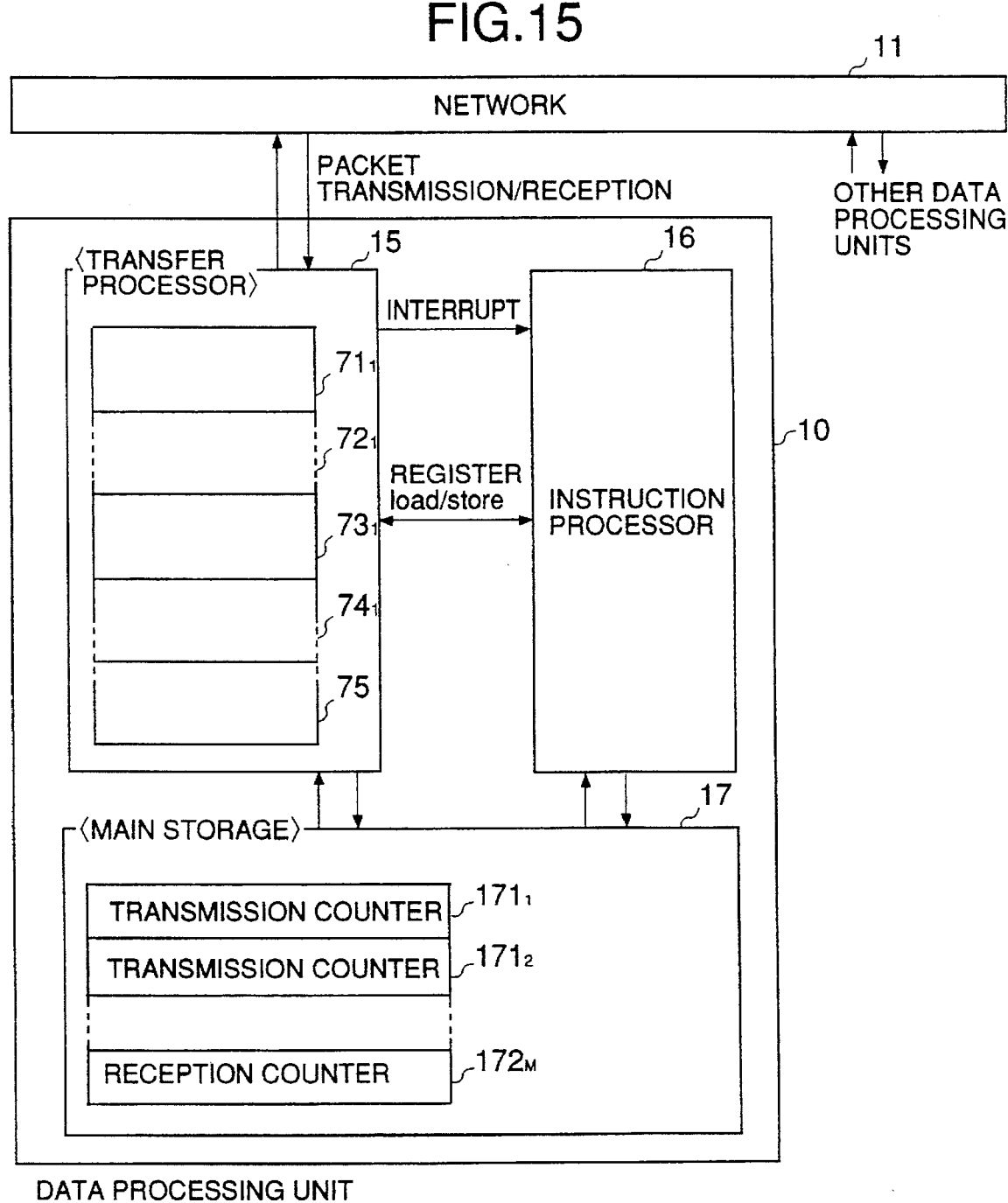
FIG. 15 is a diagram for explaining the operation of the fifth embodiment.

FIG. 15 is a diagram for explaining the operation of the fifth embodiment. In FIG. 15, those parts which are the same as those corresponding parts in FIGS. 1, 2 and 14 are designated by the same reference numerals, and a description thereof will be omitted.

In this embodiment, the transfer processor 15 includes registers $71_i$, $72_i$, $73_i$, $74_i$ and $75$ which are coupled as shown in FIG. 14, where i=1, . . . , M. The register $71_i$ stores an expected transmission counter value for a process #i, and the register $72_i$ stores a transmission counter address being examined for the process #i. The register $73_i$ stores an expected reception counter value for the process #i, and the register $74_i$ stores a reception counter address being examined fop the process #i. The transmission counter address being examined indicates the address of the corresponding transmission counter under examination in the main storage 17. Similarly, the reception counter address being examined indicates the address of the corresponding reception counter under examination in the main storage 17. In addition, the register 75 stopes an interrupt flag which indicates whether or not an interrupt has been generated with respect to the instruction processor On the other hand, the main storage 17 stores transmission counters $171_1$ through $171_M$ fop the processes #1 through #M, and reception counters $172_1$ through $172_M$ fop the processes #1 through #M, as shown in FIG. 15. The address of the reception counter $172_i$ is included in the control information within the packet header, similarly to the address of the transmission counter $171_i$, as described above with reference to FIG. 13, fop example.

Because the operation using the reception counter is basically the same as the operation using the transmission counter, a description will only be given of the operation using the transmission counter.

The register $71_i$ stopes the expected value of the transmission counter fop the corresponding process #i, where the process #i may correspond to one transfer queue of a plurality of transfer queues. The register $72_i$ stopes the address of the transmission counter $171_i$ corresponding to the process #i in the main storage 17. When the value of the transmission counter $171_i$ in the main storage 17 matches the expected value (that is, a specific value) stored in the register $71_i$ and the corresponding address stored in the register $72_i$ matches the address of the transmission counter $171_i$ in the main storage 17, the transfer controller 20A generates an interrupt with respect to the instruction processor 16 via the port 21. In addition, when generating the interrupt, the transfer controller 20A sets an interrupt flag in the register 75 so as to indicate that the interrupt has been generated.

In other words, suppose that a waiting occurs until the value of a packet counter, that is, the transmission counter $171_i$ or the reception counter $172_i$, becomes the expected (specific) value. In this case, the user program makes a system call by including as the parameters the type of packet counter, the expected value of the packet counter, and the address of the packet counter. The type of packet counter indicates whether the counter is the transmission counter $171_i$ or the reception counter $172_i$. In response to this system call, the operating system recalls the expected value and address of the packet counter, and sets this expected value in the corresponding register $71_i$, for example, and the address in the register $72_i$, for example. As a result, an interrupt with respect to the process becomes possible if required. Thereafter, the process which issued the system call described above waits, and other processes are dispatched. Because the register $72_i$ stores the address of the transmission counter $171_i$, it is possible to correctly compare the value of the transmission counter $171_i$ and the corresponding expected value even after the value of the transmission counter $171_i$ is updated.

In the case of the process #1 of the packet transmission, for example, the transfer controller 20A compares the value of the transmission counter $171_1$ and the expected value in the register $71_1$, and also compares the address of the transmission counter $171_1$ in the main storage 17 and the address stored in the register $72_1$, when the value of the transmission counter $171_1$ is decremented (or incremented) by the packet transmission. If the value of the transmission counter $171_1$ and the expected value in the register $71_1$ match, and the address of the transmission counter $171_1$ in the main storage 17 and the address stored in the register $72_1$ match, the transfer controller 20A generates an interrupt with respect to the instruction processor 16 to indicate cancellation of the specified waiting state. In addition, the transfer controller 20A sets an interrupt flag in the register 75 to indicate that an interrupt has been generated with respect to the process #1. Hence, the process #1 is changed from the waiting state to an active state in response to the interrupt.

Therefore, according to this embodiment, it is possible to reduce the overhead of the supervisor program compared to the case where the supervisor program carries out the polling of the packet counter. In addition, it is possible to eliminate the spin loop of the user program when compared to the third and fourth embodiments. In other words, no polling of the packet counter is required in this embodiment, thereby improving the throughput of the system.

Although it is preferable to provide the expected value and the address of the packet counter for each parallel process and each packet transmission/reception, it is possible to use them in common between the packet transmission and reception. However, an unnecessary interrupt may be generated in this case.

It is not essential to store the addresses of the transmission and reception counters, and the register $72_i$ and $74_i$ may be omitted. In this case, when checking the value of the transmission counter $171_1$, for example, this value is compared with all of the expected values stored in the registers $71_1$ through $71_M$. Hence, an unnecessary interrupt may be generated if this value by chance matches the expected value for another transmission counter instead of the transmission counter $171_1$. When the interrupt is generated from the transfer controller 20A in this case, the operating system checks whether or not the value of the transmission counter $171_1$ correctly matches the expected value for the transmission counter $171_1$, and changes the process #1 from the waiting state to the active state if in the affirmative. On the other hand, if in the negative, the interrupt is discarded because this interrupt is not generated for the transmission counter $171_1$.

Further, the present invention is not limited to these embodiments, but various variations and modifications may be made without departing from the scope of the present invention.

What is claimed is:

1. A data processing unit adapted to exchange data with another data processing unit via a network, said data processing unit comprising:

main storage means for storing programs and data, and comprising counter means for storing a content;

instruction processor means, coupled to said main storage means, for issuing transfer requests by executing programs stored in said main storage means; and transfer processor means, coupled to said main storage means and said instruction processor means, for enqueuing the transfer requests from said instruction processor means into a transfer request queue, and for carrying out a transfer process between said main storage means and the network based on each transfer request which is obtained from the transfer request queue, said transfer processor means comprising:

first register storing means for storing an expected value of the content of said counter means for an arbitrary process, and second register storing means for storing a flag indicating whether an interrupt has been generated with respect to said instruction processor means, said transfer processor means generating the interrupt with respect to said instruction processor means and setting the flag in said second register means when the content of said counter means and the expected value in said first register means match for the arbitrary process, wherein the content is updated by said transfer processor means every time the transfer process is carried out based on the transfer request and is accessible by said instruction processor means, and wherein said instruction processor means recognizes an end of the transfer process by said transfer processor means from the content of said counter means.

2. The data processing unit as claimed in claim 1, wherein the arbitrary process corresponds to one or a plurality of transfer request queues.

3. The data processing unit as claimed in claim 1, wherein said transfer processor means includes:

third register means for storing an address of said counter means in said main storage means for the arbitrary process.

4. The data processing unit as claimed in claim 3, wherein said instruction processor means sets the expected value and the address of said counter means for the arbitrary process in said first and third register means, respectively.

5. The data processing unit as claimed in claim 3, wherein:

said transfer processor means enqueues a plurality of transfer request queues;

a plurality of said counter means are provided in correspondence with the plurality of transfer request queues;

a plurality of said first and third register means are respectively provided in correspondence with the plurality of processes, each of said processes corresponding to one or a plurality of transfer request queues.

6. The data processing unit as claimed in claim 1, wherein said counter means stores the content which is updated every time at least one of transmission and reception is carried out by the transfer process based on the transfer request.

* * * * *

UNITED STATES PATENT AND TRADEMARK OFFICE
CERTIFICATE OF CORRECTION

PATENT NO. : 5,652,905
DATED : July 29, 1997
INVENTOR(S) : SHINJO et al.

It is certified that error appears in the above-identified patent and that said Letters Patent is hereby corrected as shown below:

Col. 11, line 24, after "port" insert --47.--;
line 27, after "controller" insert --24.--.

Col. 13, line 3, after "storage" insert --17.--;
line 6, after "when" insert --it--.

Col. 14, line 17, change "47" to --17--;
line 48, change "18" to --16--.

Col. 16, line 5, change "fop" to --for--;
line 11, change "stopes" to --stores--;
line 13, after "processor" insert --16.--;
line 15, change "fop" to --for--;
line 16, change "fop" to --for--;
line 21, change "fop" to --for--;
line 28, change "fop" to --for--;
line 30, change "stopes" to --stores--;
line 35, after "register" insert --72,--.

Signed and Sealed this

Third Day of February, 1998

Attest:

BRUCE LEHMAN

Attesting Officer

Commissioner of Patents and Trademarks